E. R. GLASER.
FRUIT JAR.
APPLICATION FILED AUG. 24, 1911.

1,023,560.

Patented Apr. 16, 1912.

ATTEST
E. M. Fisher.
F. C. Mussun.

INVENTOR
Elizabeth R. Glaser
By Fisher & Moss
ATTYS.

UNITED STATES PATENT OFFICE.

ELIZABETH R. GLASER, OF NORTH DOVER, OHIO.

FRUIT-JAR.

1,023,560.  Specification of Letters Patent.  Patented Apr. 16, 1912.

Application filed August 24, 1911. Serial No. 645,817.

*To all whom it may concern:*

Be it known that I, ELIZABETH R. GLASER, a citizen of the United States, residing at North Dover, in the county of Cuyahoga and State of Ohio, have invented certain new and useful Improvements in Fruit-Jars, of which the following is a specification.

This invention relates to fruit jars, and the invention consists in means for keeping the fruit beneath the liquid level in the jar when the fruit is canned and the jar is covered and sealed.

Figure 1:
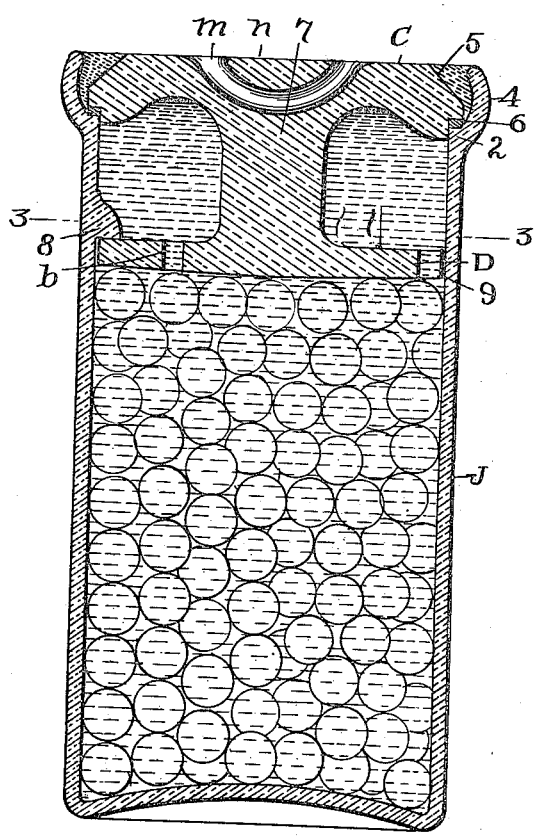
Figure 2:
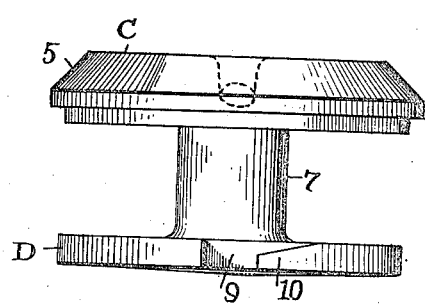
Figure 3:
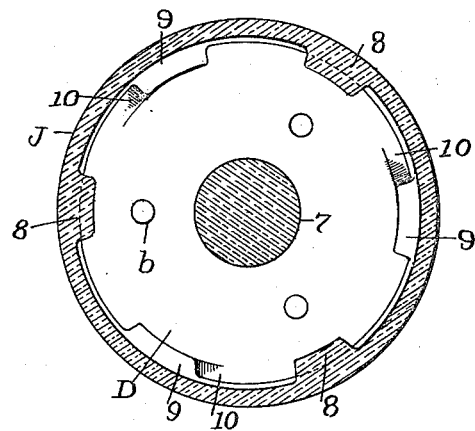
Figure 4:
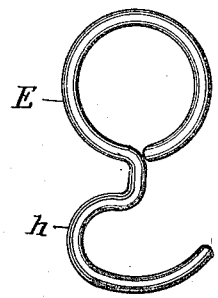

In the accompanying drawings, Figure 1 is a longitudinal section of a fruit jar embodying my invention. Fig. 2 is an elevation of the cover apart from the jar and showing the stem and disk on the bottom thereof whereby the fruit is kept immersed in the liquid as hereinafter fully described. Fig. 3 is a cross section of the jar and the said stem and showing the said disk beneath on line 3—3, Fig. 1. Fig. 4 is a plan view of the tool or instrument I use for both affixing and removing the cover and its extension in and from the jar.

It is well known that if mold or decomposition forms on fruits or vegetables that have been canned it gathers first on the stock that has floated to the top of the liquid and is more or less exposed above the liquid. Furthermore, under exactly the same conditions otherwise in the jar there will be no sign of decay or fermentation or mold if the stock be wholly submerged beneath the top surface of the liquid and there is no exposure thereof at the top. This observation has led up to the present invention which, as above indicated, consists in means for permanently depressing the canned goods beneath the surface of the liquid employed to preserve the same, relatively as shown in Fig. 1.

Of course I am aware that in any broad sense it is not a new practice to submerge salt meats, pickles and other articles by placing covers directly upon them with weights to hold the covers down, but my invention differs from all such means and methods in this that it applies to goods confined in hermetically sealed jars or cans and consists in a submerging or depressing medium which is unitary with the cover itself.

Now, referring again to the drawings, J represents a fruit or vegetable jar of an original construction, particularly in its top or upper portion, where the same is shown as having a flat offset shoulder or seat 2 about its inside at the immediate top of the straight side portion of the jar and from about which there is an upwardly and outwardly extending flange 4 deep enough to receive the cover C flush with the top thereof, in this instance. Presumably all the parts are made of glass, though not necessarily, and the said flange, rim or crown 4 is shown as slightly curved in cross section both within and without, and especially within so as to provide something of a recess about the edge of the cover wherein the sealing wax or paraffin will make firm sealing engagement, and the cover preferably has a beveled edge 5 more or less opposite said recess and coöperating therewith in sealing the jar while otherwise said cover rests on the seat 2. The said seat may also be provided with a rubber gasket 6, if deemed desirable.

Now, in order to effect the more important object of keeping the contents of the jar beneath the solution or liquid, I provide the cover C with a disk or shield D suspended therefrom by means of a central stem 7 and make the combined device of such depth relatively that when the cover is in place the said disk or shield is at the requisite level in the jar. Of course gravity alone would hold the device in place, but in addition to this I provide positive means for engaging the device with the jar. To this end the jar is provided with several inwardly projecting lugs 8 internally near its top and the said disk D has notches or recesses 9 in its edge corresponding to said lugs in position and size and adapted to pass down to a plane beneath the same, and the said disk is beveled or inclined at 10 on corresponding sides of said notches so as to enable the disk to slide beneath said lugs at said inclinations when rotated and thus make a locking engagement therewith in a camlike action. The said disk does not fit the jar closely about its edge, but in addition may have one or more perforations *b* or their equivalent in its body portion so as to pass liquid above or over the same.

The cover C has a curved channel *m* formed in its top and center and a bridge portion *n* over said channel under which I engage the hook *h* of the tool E and rotate the cover to both closing and opening position. The bottom of the cover is shown as extending down past the seat 2 and a rubber gasket 6 may be used on the said seat if preferred.

What I claim is:

A fruit jar having an annular enlargement about its top with a seat about its inside for the cover and a plurality of inwardly projecting lugs within the upper portion of the jar below said seat and having bottom engaging surfaces, in combination with a cover on said seat having a stem and a disk thereon provided with notches in its edge adapted to pass said lugs through the same and having inclined surfaces at one side of said notches adapted to ride beneath said lugs and lock the cover in the jar, and the said cover constructed on its top to engage a tool therewith to rotate the same, whereby the cover is removably and firmly secured upon the jar and a liquid space is provided between the said cover and the said disk which keeps the fruit submerged.

In testimony whereof I affix my signature in presence of two witnesses.

ELIZABETH R. GLASER.

Witnesses:
PHIL L. FRAMBOUR,
EDNA L. SEITZ.